United States Patent
Dang

(10) Patent No.: US 7,007,231 B2
(45) Date of Patent: Feb. 28, 2006

(54) DOCUMENT MANAGEMENT SYSTEM EMPLOYING MULTI-ZONE PARSING PROCESS

(76) Inventor: Chi Hung Dang, 7901 E. Hardy St., Tucson, AZ (US) 85750

( * ) Notice: Subject to any disclaimer, the term of this patent is extended or adjusted under 35 U.S.C. 154(b) by 810 days.

(21) Appl. No.: 10/039,572

(22) Filed: Jan. 7, 2002

(65) Prior Publication Data

US 2003/0131312 A1    Jul. 10, 2003

(51) Int. Cl.
*G06F 17/00*    (2006.01)

(52) U.S. Cl. .................. 715/523; 715/517; 715/526

(58) Field of Classification Search .......... 715/517, 715/523, 513, 526; 707/1
See application file for complete search history.

(56) References Cited

U.S. PATENT DOCUMENTS

| | | | |
|---|---|---|---|
| 6,012,098 A * | 1/2000 | Bayeh et al. | 709/246 |
| 2002/0078097 A1* | 6/2002 | Chen et al. | 707/517 |
| 2003/0106021 A1* | 6/2003 | Mangrola | 715/513 |

* cited by examiner

*Primary Examiner*—Sanjiv Shah
*Assistant Examiner*—Adam Queler

(57) ABSTRACT

A document management system that converts documents from different sources such as scanners, Fax machines, and workstations into electronic documents and provides file management to manage the document storage and retrieval. The system comprises parsing engines that subdivide the document presentation into multiple presentation zones, parse data of each presentation zone with different parsing program or programs to provide output data in format or formats preferable for said zone, and reconstruct the document by recomposing the output presentation of all presentation zones.

18 Claims, 3 Drawing Sheets

| NAME (31) | JOE BLACK (32) |
|---|---|
| ADDRESS (31) | 5000 E. Speed Way Tucson AZ 85710 (32) |
| TELEPHONE (31) | (520) 678 9876 (32) |
| ACCOUNT # (31) | 123-4567-789 (32) |

| ORDERED ITEMS (31) | ITEM PRICE ($) (31) | TOTAL ($) (31) |
|---|---|---|
| ITEM 1 (34) | 100.00 (34) | 100.00 (34) |
| ITEM 2 (34) | 200.00 (34) | 300.00 (34) |
| ITEM 3 (34) | 150.00 (34) | 450.00 (34) |

SHIPPING COST (31)

(ITEM 1 WEIGHT + ITEM 2 WEIGHT + ITEM 3 WEIGHT ) * (DISTANCE) * ( $ / MILE / LB ) = $$$$$$ (33)

| CUSTOMER SIGNATURE (31) | DATE (31) |
|---|---|
| Joe Black (30) | 11/5/2004 (30) |

(INSERT ITEM PICTURES) (36)

DOCUMENT MANAGEMENT SYSTEM EMPLOYING MULTI-ZONE PARSING PROCESS

BACKGROUND OF THE INVENTION

1. Field of the Invention

The present invention relates to document management system that converts documents from different sources such as scanners, Fax machines and workstations into electronic documents and provides file management facility to manage the storage and retrieval of such documents.

2. Background of the invention

With the availability of computers and workstations, there was a desire to convert documents into electronic form for efficient editing, storage and management. Since the arrival of the Internet and E-commerce, such desire becomes more apparent. The tasks of converting and managing documents are very complex processes because documents always will be presented and exchanged in both forms: hard copy and electronic forms. To further complicate this matter, electronic documents may be generated from different platforms with different formats and presentation soft wares. A commonly used process is scanning hard-copy documents and storing the images as TIF files before converting to PDF format which provides additional system flexibility. PDF formats can be Image Only PDF formats that encapsulate the TIF files or PDF image and text formats that show both the image and provide access to the OCRed text. In general, all electronic documents produced either by scanning of hard copies or by electronic processes can be converted to PDF formats or any other formats by parsing processes, which place the document presentation data into a print stream and feed it through a parser or parsers. Each parser parses the document data and converts it into the format, which said parser is built for before sending the output data to a repository engine. Typically, PDF format is commonly used for complete document image presentation and XML format is useful for data processing and analysis. However, converting complete documents to a single presentation format inherits several drawbacks such as inflexibility and insufficiency: at minimum, document functionality must include presenting complete and comprehensive image presentation of contained information, providing data for analysis and facilitating avenue for correction or modification. TIF format provides compact storage of image data and viewers for TIF files are available in most workstation, but it is not suitable for data extraction and image modification. PDF is more flexible, it can provide both image and text presentation formats, but modification is difficult and requires additional software. A document may include several presentation zones, each possesses different characteristics, functionalities, and requirements, therefore it is desirable to covert each presentation zone to format that is most suitable for its requirements. The concept of converting different zones of a document into different formats can overcome the shortcomings of converting a complete document into one single format. With the growth of E-commerce across the Internet, users must be able use personal computers to access documents such as application or purchase order forms and modify said forms before submitting. Such documents typically contain static presentation zones including the merchant logo, instructions and general information and dynamic presentation zones where the users fill in other required information. It is advantageous to convert the static zones to image format such as TIF file that is most suitable for viewing only and the dynamic zones to text format such as XML or any other text editor that is best for editing and data extraction, some text editor is available in most personal computers or work station.

SUMMARY OF THE INVENTION AND OBJECTS

The object of this invention is to provide a document management system that acquires documents from different sources, converts said documents into electronic forms suitable for complete image presentation, data processing and content modification, and contains an efficient file management that is essential for controlling the repository of a massive amount of document data.

The system of the present invention comprises parsing engines that subdivide the document presentation into multiple presentation zones, parse data of each presentation zone with different parsing program or programs to provide output data in format or formats preferable for said zone, and reconstruct the document by recomposing the output presentation of all presentation zones.

This and other objects and advantages of this invention will become apparent through examining the following description of the arrangement, operations and functionalities of the constituent components and appended claims in conjunction with the attached drawings.

DETAILED DESCRIPTION OF THE INVENTION

Figure 1:
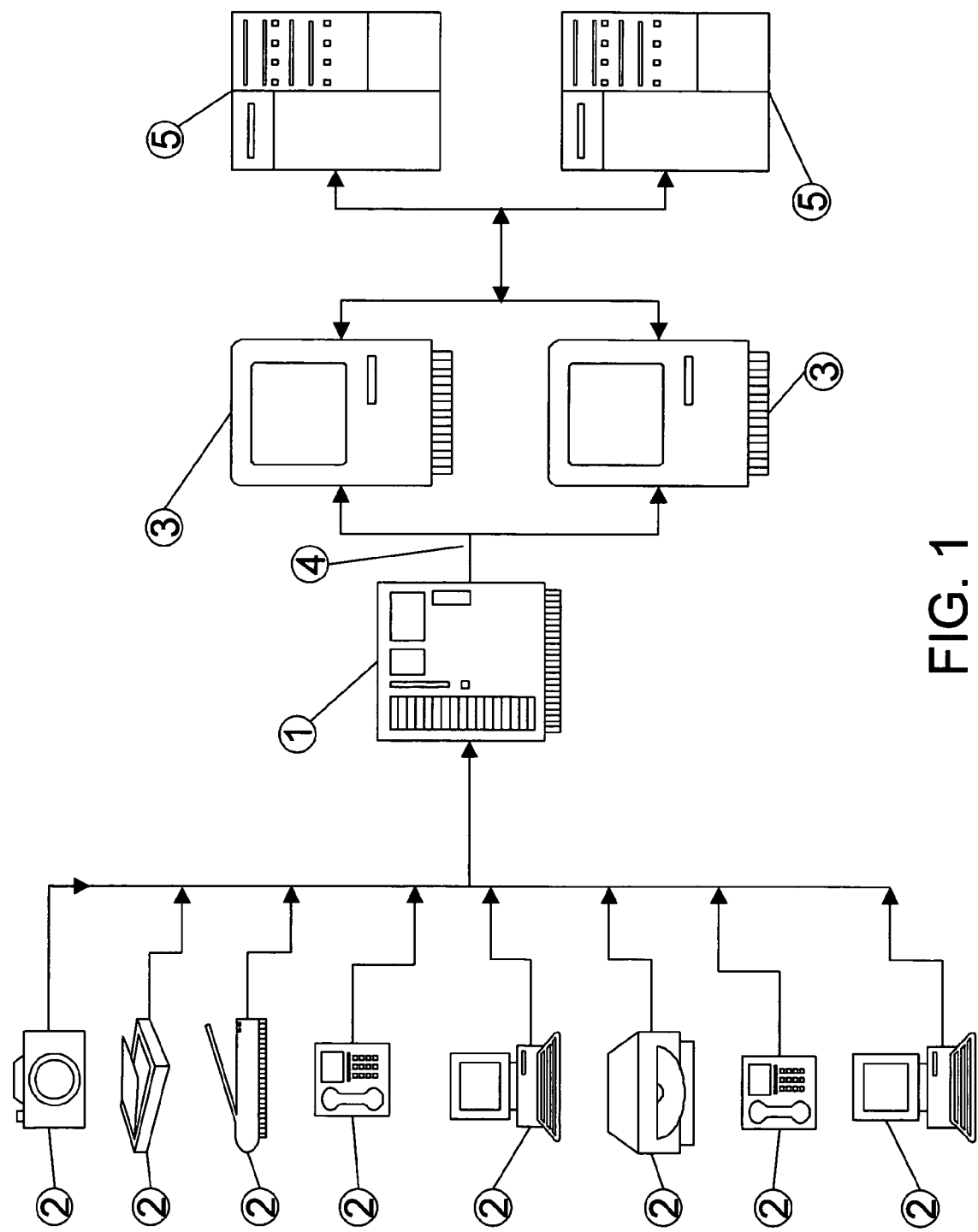
FIG. 1 is a schematic partial illustration of a document management system of the present invention.

The embodiment of the present invention comprises:

Document acquisition engines 1 that collect document presentation data from document generators 2 such as Fax machines, page scanners, and workstations, and convert data to single format data streams 4 such as print streams.

One or a plurality of parsing engines 3 that parse documents contained in data streams 4 fed into parsing engines 3 from the acquisition engines 1. Parsing engines 3 map each page of input documents into one or a plurality of predetermined presentation zones following the presentation template, parse the presentation of each presentation zone into one or a plurality of output presentation formats determined by the presentation templates, and reconstruct the complete presentation of said page in one or a plurality presentation options by retrieving and placing selected output presentation formats called for by the selected option or options into each presentation zone following the presentation template.

One or a plurality of repository engines 5 that manage the data storage and retrieval processes of out put data sent from the parsing engines and provide physical storage facilities.

Referred to FIG. 1, one preferred embodiment of the present invention comprises:

Document acquisition engines 1 that may include one or a plurality of computers connected to collections of document generators 2 such as Fax machines, page scanners, digital cameras, and workstations. With Fax machines and page scanners, the images are scanned and stored as TIF files by the scan application. TIF files provide compact storage of image data using CCITT Group IV compression. The images from digital cameras are typically collected as JPEG or TIF files. With the workstations, documents can be generated with several software packages such as Solid works, Auto CAD, Pro E and Microsoft word, these documents may be sent to the acquisition engines 1 in the original formats if the acquisition engines support such formats, otherwise they must be converted to TIF or JPEG. The document acquisition engines 1 convert all document data to one single format before sending it to next step in the process. The most readily available format is the print stream, since most software packages include their own device drivers for printing.

Parsing engines 3 comprising one or a plurality of computers, each may contain mapping programs to map each page of an input document into one or a plurality of predetermined presentation zones following the presentation template, parsing programs to parse the presentation of each presentation zone into one or a plurality of output presentation formats determined by the presentation template, and reconstructing programs to reconstruct the completed presentation of said page in one or a plurality presentation options by retrieving and placing selected output presentation formats called for by the selected option or options into each presentation zone following the presentation template. Each presentation template must be designed specifically for each document type and may include one or a plurality of complete presentation options that have identical presentation zone mapping but different zone presentation formats. Each presentation template comprises complete presentation option identifications, presentation zone identifications, mapped location of each presentation zone, and parsing program identification of each zone for each complete presentation option. Parsing programs may be stored within the parsing engines 3 with unique identifications for retrieval reference. Most parsing programs are commercially available and are selected based on the input and output platforms and formats.

Repository engines 5 that comprise one or a plurality of computers, each contains data storage hardware such as disk drives, optical drives and tape drives and repository management to manage the data files storage, indexing, searching, and retrieval processes. The repository management may include self-contained file management such as JAR or ZIP and combinations of database such as LDAP, WEBDAV Server, and SOAP Server together with file management such as NIS, NFS, and NTFS.

It is obvious to a person skilled in the art that, all of the above constituent components and programs can be packed in one computer or can be rearranged in several computers.

The parsing output presentation format options may include:

Figure in image presentation format: such as PDF, TIF and JPEG presenting images of figures, drawings, graphs, charts, diagrams, pictures, and text image.

Text in text format: such as any text editor, ASCII file and XML describing the text content. With this format, the recognition of text symbols is required, and the text can be regenerated with different fonts and sizes.

Mathematic equation presentation in executable equation format.

Spreadsheet presentation in executable calculation spreadsheet format such as EXEL spreadsheet.

Blank presentation format showing blank

File inserting format for inserting pre-generated file.

Figure 3:
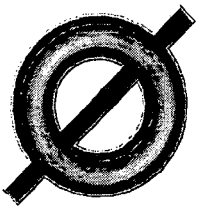
FIG. 3 is a schematic partial illustration of the presentation zones proposed by the present invention.

The presentation zone or zones of a document may be categorized into the following categories, as illustrated in FIG. 3:

Static figure in image presentation format zone 29: wherein the figure images are unchanged with every document of the same type and are presented in image presentation formats such as TIF or JPEG. For examples: company logos, graphic art designs, charts, diagrams, graphs, drawings, pictures, and static text which original image must be preserved.

Dynamic figure in image presentation format zone 30: wherein the figure images vary with every document and are presented in image presentation formats such as TIF or JPEG. For examples: personal signature, personal fingerprints, variable charts, graphs, drawings, diagrams, pictures, and dynamic text which original image must be preserved.

Static text in text format presentation zone 31: wherein the original text contents must be preserved during the parsing process, and remain unchanged for every document of the same type. Recognition of text symbols is required; the text can be regenerated with different text fonts and sizes, and may be presented in text formats such as XML or any text editor.

Dynamic text in text format presentation zone 32: wherein the original text contents must be preserved during the parsing process, but not the original text images, recognition of text symbols is required and the text can be regenerated with different text fonts and sizes. This dynamic text varies with every document, may be edited or modified after parsing, and may be presented in text formats such as XML or any text editor.

Executable equation format zone 33: wherein text and standard mathematical symbols such as $+, -, \times, /, =$, and $\%$ form executable equations.

Executable calculation spreadsheet format zone 34: wherein data is formed into columns and rows of spreadsheets that can perform executable calculations.

No parsing with blank presentation zone 35: wherein the output presentation is blanked.

No parsing with file inserting format zone 36: wherein the output presentation is reconstructed with another data file.

In general, the parsing process of each document comprises the following steps:

1. Retrieve the presentation template for the specific document
2. Evoke the mapping program and map the input document into one or a plurality of predetermined presentation zones following the presentation template,
3. Select and set the presentation option identification.
4. Identify each zone with its presentation zone identification, determine and retrieve the parsing program which identification is assigned to said zone for said option by the presentation template, and parse the presentation of said zone.
5. Store parsed data into the document file, which contains the complete presentation data of the said document with references to the presentation option identification and zone identification.
6. Repeat steps 4 to 5 until all zones are parsed.
7. Repeat steps 3 to 6 until all presentation options are executed.

The reconstruction process then includes:
1. Retrieve the presentation template for the specific document
2. Evoke the mapping program and map output presentation into one or a plurality of predetermined presentation zones following the presentation template, identify each zone with its presentation identification.
3. Select the presentation option, with the said selected option identification and the zone identifications, retrieve and install parsed data to each zone following the presentation template for the selected option.

To utilize existing commercially available parsing programs, it is advantageous to employ a multi-layer parsing process wherein the parsing process of a page comprises one or a plurality of parsing layers. In each parsing layer, the mapping program maps the page into parsing zones that to be parsed, following the sub-layer template designed for said sub-layer, and all parsing zones are parsed with the parsing program called for by the sub-layer template. In this process, the presentation template may contain presentation option identifications and all sub-layer templates for each and every presentation option. Each sub-layer template may contain mapped locations of parsing zones to be parsed in said sub-layer, parsing zone identifications and parsing program identification for said sub-layer.

In general, the multi-layer parsing process of each document comprises the following steps:
1. Retrieve the presentation template for the specific document 2. Set the presentation option identification, and retrieve all sub-layer templates contained in said option.
3. Evoke the mapping program and map the input document into one or a plurality of predetermined presentation zones following each sub-layer template,
4. Parse each and every zone in said sub-layer with the parsing program which identification is assigned to said sub-layer until all zones are parsed.

5. Store data into the document file, which contains the complete presentation data of the said document with a reference to the presentation option identification, sub-layer identification and zone identification.

6. Repeat steps 3 to 5 until each and every sub-layer are parsed 7. Repeat steps 2 to 6 until all parsing options are executed.

The reconstruction process then may includes:
1. Retrieve the presentation template for the specific document
2. Select the presentation option, and retrieve all sub-layer templates contained in said option.
3. Evoke the mapping program and map the output presentation into one or a plurality of predetermined presentation zones following each sub-layer template, and identify the zone identification.
4. With the sub-layer identification and zone identification, retrieve and install parsed data into each zone following the said sub-layer template.
5. Repeat steps 3 to 4 until each and every sub-layer are reconstructed.
6. Reconstruct the complete presentation by superimposing all presentation layers.

In a parsing process involving several complete presentation options, if a zone is to be parsed with an identical parsing format in more than one complete presentation option, said zone needs to be parsed only once and data may be reused in the reconstruction process.

To manage the data storage and retrieval processes in the repository engines 5, each document file is characterized by key reference attributes referred as indexing attributes, which may include the organization identification, the document identification, the user identification, the account identification, date of the document, and the document type identification. The document files are placed and organized in the repository engines 5 by using the indexing attributes to determine the storage hierarchy and to construct the indexing logic for searching and retrieval. To automatically identify the document indexing attributes, each parsing engine further comprises a program to map out the document indexing attribute zones following the indexing template, the presentation of each document indexing attribute zone is parsed into text in text format and is stored as the document indexing attribute data in the indexing file.

In many applications wherein the complete presentation of documents is not required or needs to be stored strictly for archival purpose, only some key data is accessed frequently for data processing and analysis. It is advantageous to parse the said key data separately and store it as resume data in the resume file, which is often organized into spreadsheet format in the output presentation. It is conceivable to extract the indexing attribute data and the resume data from the complete presentation parsing process if the zones containing such data are parsed with text format options.

For efficiency, the repository engines may contain three directories: the indexing directory that stores the indexing files, the resume directory that stores the resume files and the document directory that stores the document files. The storage hierarchy of the indexing directory is organization identification, user identification and the file name is the document identification, wherein the storage hierarchy of the resume and document directories is organization identification and the file name is the document identification.

The document file searching and retrieval process then comprises these following steps:
1 Entering the indexing directory.
2 Using two indexing attributes: the organization identification and the user identification to search and open the indexing data of all documents belong to the said user.
3 From the indexing data of indexing files, using other indexing attributes such as document type identification, account identification and date to determine the specific file that is searched for, and identify the document identification for the next step.
4 Entering the resume and document directories.
5 Searching and retrieving the resume and document files by using two indexing attributes: the organization identification and the document identification.

The file searching process can be automated with a file management program such as JAR file and ZIP file, and the procedure comprises the following steps:
1 The user enters the organization identification and the user identification.
2 The repository engine 5 evokes the searching program in the file management program.
3 The searching program enters the indexing directory, retrieves the indexing attributes data of all documents belong to said user in said organization, constructs, and displays an indexing table, which contains all indexing attributes of all document in an organized fashion following a predetermined grouping hierarchy.
4 The user selects the document using other indexing attributes.
5 The searching program enters the resume and document directories and uses the organization identification and document identification to locate and retrieve the resume and document files of the document selected by the user.

The presentation templates, indexing templates and the resume templates may be stored in the repository engines 5 or be included in the data stream sent to the repository engines. For performance however, the parsing engines 3 may contain all templates of documents to be parsed by said parsing engines. The indexing template is identical for all documents. The presentation templates and the resume templates vary with the organizations and the document types, they are stored with two indexing attributes: the organization identification and the document type identification.

The parsing process comprises:

Load the indexing template.

Parse the document indexing attribute zones to identify the organization identification, the document type identification and all other indexing attributes, and store data in the indexing file.

With the organization identification and the document type identification, retrieve and load the resume template.

Parse the resume zones, collect and store the resume data.

With the organization identification and the document type identification, retrieve and load the presentation template.

Parse the presentation zones, collect and store the presentation data.

The image reconstruction process comprises:

With the organization identification and the document type identification, retrieve and load the presentation template.

With the document identification, retrieve the presentation data and reconstruct the document image following the presentation template.

To further improve the parsing efficiency for all documents of the same type, the static figures and the static text in image presentation format are generated in advance by either parsing process or electronic composition, and stored in the parsing engines 3 with two indexing attributes: organization identification and document type identification, the zones containing said static figures and text are designated as No parsing with file inserting format in the presentation templates. During the reconstructing process, the pre-generated image data of the static figures and text are retrieved and inserted back into the said zones following the presentation templates. This approach not only minimizes the required storage space, it also reduces the parsing time, reconstructing time and the data transmitting time.

Figure 2:
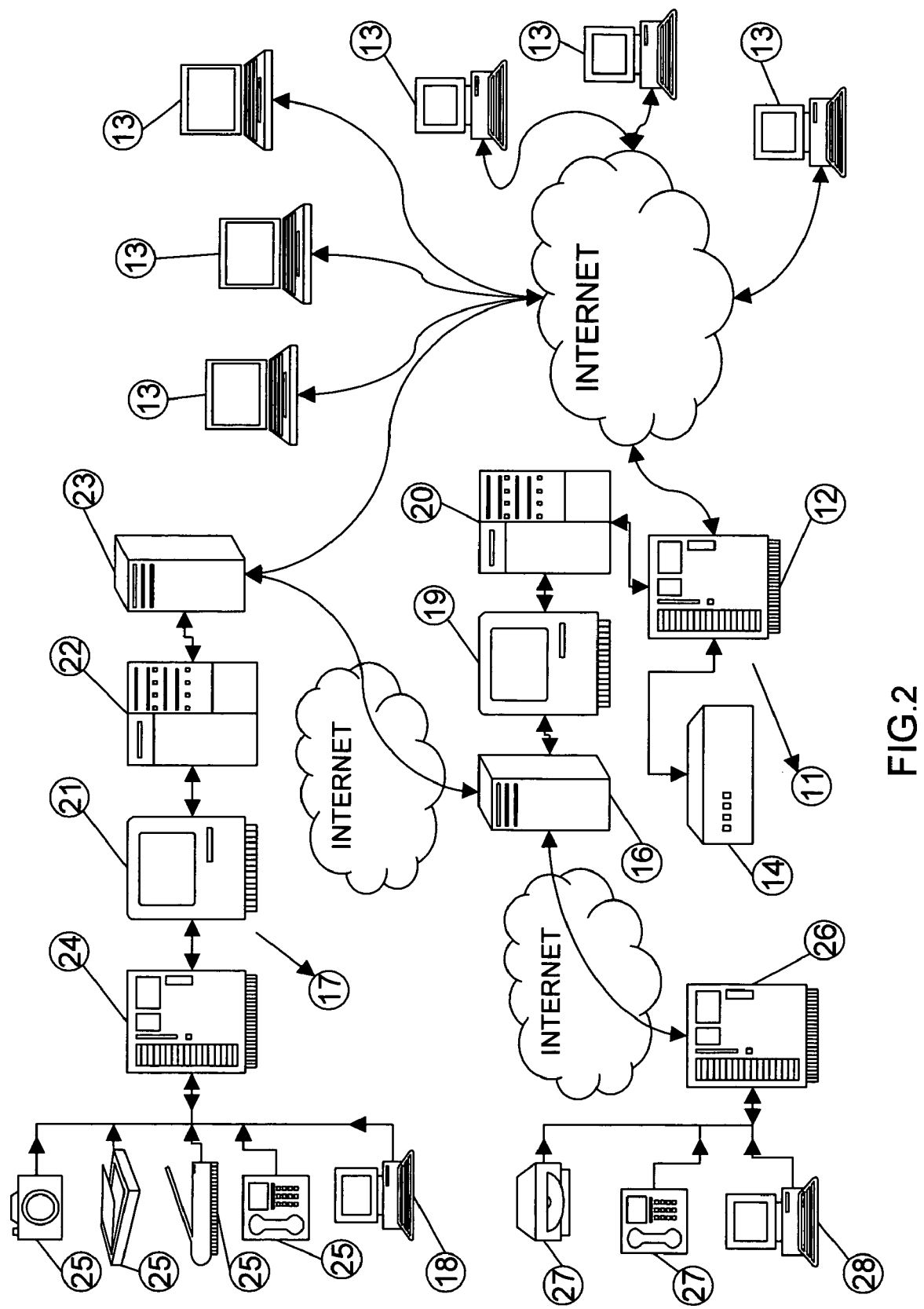
FIG. 2 is a schematic partial illustration of a document management service provider system of the present invention.

With the expansion of E-commerce across the Internet, many businesses not only need to provide static information promoting their images, products and services, they must also interact with customers or clients. Interaction by exchanging documents such as purchase orders, service request applications, billing statements, shipment status, and transaction statements, requires complex document management and expensive development effort. Therefore, it is desirable to contract out this type of file management to a service provider, especially for small organizations that have limited resources and capital. In general, a document service provider system as illustrated in FIG. 2 comprises:

A host document management system 11 that is locally located at the facility of said service provider. The said host document management system comprises one or a plurality of Web server engines 12 that facilitate the communication services such as receiving and responding to the user requests between the host document management system 11 and a collection of Internet user systems 13, security engines 14 such as LDAP servers for authenticating users and authorizing services, host parsing engines 19 for parsing documents, host repository engines 20 for storing output data and host communication engines 16 for controlling the communication between the host and the client systems. The Web server engines 12 may include one or a plurality of Web page templates for each organization and Web page re-composition programs, which compose the Web pages by filling in the templates with related data retrieved from the host repository engines 20. The Web page templates are preferably generated in HTML conforming to XML format and the Web page re-composition program is preferably written in JAVA class. The re-composition program may be designed to further include means for modifying the Web page templates dynamically by the system administrators.

One or a plurality of client document management systems 17 that is remotely located at the facilities of the service subscribers and is linked to the host system 11 across the Internet. Each of the said client document management systems 17 comprises client parsing engines 21 for parsing documents, client repository engines 22 for storing output data from the parsing engines 21, client communication engines 23 for controlling the communication between the host system 11 and the said client system and document acquisition engines 24 to collect document presentation data from a collection of client document generators 25 and computers 18; the document acquisition engines 24 convert data into one single format, envelop all data into data streams and send said data streams to the client parsing engines 21. The parsed data is sent across the Internet to the host document management system 11 where the documents are reconstructed by the host parsing engines 19. Data is stored at either the client repository engines 22 or the host repository engines 20 or both. This type of set up is more suitable for subscribers who have large workload requirements. To improve efficiency by reducing data storage space and cutting down the time required for parsing, reconstructing, and data transmitting, the static figures and text in image presentation format of documents of the same types are generated in advance and stored in the host parsing engines 19 that service the said types of document. The stored static data is later used for the document reconstruction process. Since only the dynamic data is sent across the Internet, it automatically provides additional security measure due to the fact that the intruders have no templates and static data to reconstruct the complete documents.

One or a plurality of client document acquisition engines 26 that are remotely located at the facilities of the service subscribers. The document acquisition engines 26 collect document presentation data from a collection of client document generators 27 and computers 28, convert data into one single format, envelop all data into data streams and send said data streams across the Internet to the host system 11 where the documents are parsed, and reconstructed by the host parsing engines 19. Data is stored at the host repository engines 20. This type of set up is more suitable for subscribers who have small workload requirements.

Communication across the Internet is an effective way to reduce the communication infrastructure cost, however, it puts the data security at risk. Virtual Private Network (VPN) may be implemented to provide secure connections across the Internet between the host system and the client systems. The VPN encapsulates the IP data gram in order to maintain data privacy and integrity. To improve the level of security protection, the communication engines may further include firewalls and other security measures.

As parts of two ways communication, the authorized users may request for documents and fill in required information or make modifications before sending said documents back directly to the service subscribers who are responsible for processing and responding to the said documents. It is possible that the modified documents are sent to and stored at the service provider system 11 for later retrieval by the service subscribers. The service subscribers may elect to post the status and results of their responses through the document management service provider where the users may gain access, view, and keep track of the responses.

Having described and disclosed my invention, I claim:

1. A document management system that comprises:
one or a plurality of parsing engines that parse documents contained in data streams fed into said parsing engines, each of said parsing engines contains mapping programs to map each page of an input document into one or a plurality of predetermined presentation zones following the presentation template, parsing programs to parse the presentation of each presentation zone into one or a plurality of output presentation formats determined by the presentation template, and reconstructing programs to reconstruct the completed presentation of said page in one or a plurality presentation options by retrieving and placing selected output presentation formats called for by the specific presentation option or options into each presentation zone following the presentation template; the output presentation format options comprise: figure in image presentation format; text in text format describing the text content, in this format, the recognition of text symbols is required, and the text can be regenerated with different fonts and sizes; mathematic equation presentation in executable equation format; spreadsheet presentation in executable calculation spreadsheet format; blank presentation format showing blank; and file inserting format for inserting pre-generated file;
one or a plurality of repository engines to store the output data sent from the parsing engines, each of said parsing engines may retrieve the output data of a document parsed by another parsing engine and reconstruct said document.

2. A document management system of claim 1 wherein the presentation zone categories comprise:
static figure in image presentation format zone wherein the figure images are unchanged with every document of the same type and are presented in image presentation formats;
dynamic figure in image presentation format zone wherein the figure images may vary with every document and are presented in image presentation formats;
static text in text format presentation zone wherein the original text contents remain unchanged for every document of the same type and must be preserved during the parsing process, the text is presented in text format and can be regenerated with different text fonts and sizes;
dynamic text in text format presentation zone wherein the original text contents may vary with every document and must be preserved during the parsing process, the text is presented in text format and can be regenerated with different text fonts and sizes;
executable equation format zone wherein text and standard mathematical symbols such as +, −, ×, /, =, and % form executable equations;
executable calculation spreadsheet format zone wherein data is formed into columns and rows of spreadsheets that can perform executable calculations;
no parsing with blank presentation zone wherein the output presentation is blanked; and
no parsing with file inserting format zone wherein the output presentation is reconstructed with pre-generated data files.

3. A document management system of claim 2 wherein the parsing process further comprises document resume parsing process, which parses the resume zones containing the document key descriptive attributes into text format presentation following the resume template, the output data is stored as resume file.

4. A document management system of claim 3 wherein the parsing process further comprises document indexing parsing process, which parses the indexing attribute zones containing the document key indexing attributes into text format presentation following the indexing template, the output data is stored as indexing file.

5. A document management system of claim 4 wherein the document indexing attributes include the organization identification, the document identification, the user identification, the account identification, and the document type identification.

6. A document management system of claim 5 wherein the parsing engines contain the presentation templates, the resume templates and the indexing templates of documents to be parsed by said parsing engine, the indexing template is identical for all documents, the presentation templates and the resume templates vary with the organizations and the document types, and are stored with two indexing attributes: the organization identification and the document type identification.

7. A document management system of claim 6 wherein the parsing process comprises:
load the indexing template;
parse the document indexing attribute zones to identify the organization identification and the document type identification;
load the resume template;
parse the resume zones, collect, and store the resume data;
load the presentation template; and
parse the presentation zones, collect, and store the presentation data.

8. A document management system of claim 7 wherein the image reconstruction process comprises:
load the presentation template; and
retrieve the presentation data and reconstruct the document image following the presentation template.

9. A document management system of claim 5 wherein the static figures and text in image presentation format are generated in advance and stored in the parsing engines with two indexing attributes:
organization identification and document type identification and the zones containing said static figures and text are designated as No parsing with file inserting format by the presentation templates; during the reconstruction process, the static figures and text are retrieved and inserted back into said zones following the presentation templates.

10. The document management system of claim 4 wherein the repository engine contains three directories: the indexing directory that stores the indexing files, the resume directory that stores the resume files and the document directory that stores the document files containing the output document presentation data.

11. The document management system of claim 10 wherein the storage hierarchy of the indexing directory is the organization identification, the user identification, and the file name is the document identification.

12. The document management system of claim 11 wherein the storage hierarchy of the resume and document directories is the organization identification, and the file name is the document identification.

13. The document management system of claim 12 wherein the document file searching process comprises:
   entering the indexing directory;
   using two indexing attributes: the organization identification and the user identification to search and open the indexing data of all documents belong to the said user;
   from the indexing data of indexing files, using other indexing attributes such as document type identification, account identification and date to determine the specific file that is searched for, and identify the document identification for the next step;
   entering the resume and document directories; and
   searching and retrieving the resume and document files by using two indexing attributes: the organization identification and the document identification.

14. The document management system of claim 12 wherein the document file searching process comprises:
   the user inputs the organization identification and the user identification;
   the repository engine enters the indexing directory, retrieves the indexing attributes data of all documents belong to said user in said organization, constructs, and displays an indexing table, which contains all indexing attributes of all document in an organized fashion following a predetermined grouping hierarchy;
   the user selects the document using other indexing attributes; and
   the repository engine enters the resume and document directories and uses the organization identification and document identification to locate and retrieve the resume and document files of the document selected by the user.

15. The document management system of claim 10 wherein the storage hierarchy of the resume and document directories is the organization identification, and the file name is the document identification.

16. A document management system of claim 2 wherein the zones containing the document key descriptive attributes are parsed into text format presentation.

17. A document management system of claim 2 wherein the zones containing the document key indexing attributes are parsed into text format presentation.

18. A document management system of claim 17 wherein the zones containing the document key descriptive attributes are parsed into text format presentation.

* * * * *